United States Patent [19]
Elgamal

[11] Patent Number: 6,138,107
[45] Date of Patent: *Oct. 24, 2000

[54] METHOD AND APPARATUS FOR PROVIDING ELECTRONIC ACCOUNTS OVER A PUBLIC NETWORK

[75] Inventor: Taher Elgamal, Palo Alto, Calif.

[73] Assignee: Netscape Communications Corporation, Mountain View, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/583,227

[22] Filed: Jan. 4, 1996

[51] Int. Cl.$^7$ .............................. G06F 17/60; H04L 9/00
[52] U.S. Cl. ................................ 705/39; 380/24; 235/379
[58] Field of Search ................. 380/24; 705/26, 705/39, 30, 35; 235/379, 380

[56] References Cited

U.S. PATENT DOCUMENTS

| | | | |
|---|---|---|---|
| 5,384,449 | 1/1995 | Pierce | 235/380 |
| 5,671,279 | 9/1997 | Elgamal | 380/23 |
| 5,689,565 | 11/1997 | Spies et al. | 380/25 |
| 5,692,132 | 11/1997 | Hogan | 395/227 |
| 5,757,917 | 5/1998 | Rose et al. | 380/25 |
| 5,826,241 | 10/1998 | Stein et al. | 705/26 |

OTHER PUBLICATIONS

Linehan & Tsudik, IBM Research, Jul., 1995, "Internet Keyed Payments Protocol".
Wired, Oct. 1995, Scans, "Banking with First Virtual".
MacWorld, Nov. 1995, "Money on the Line", p. 114.
Borenstein & Rose, First Virtual Holdings, Oct., 1994, "The application/green–commerce MIME Content–type".
Stein et al., "The Green Commercial Model", Oct., 1994.
"Encryption and Internet Commerce," First Virtual Holdings, Inc., 1995.
Secure Transaction Technology, Version 1.0, "Securing The 'Net".
"Secure Electronic Payment Protocol," Draft Version 1.1, Sep. 29, 1995, MasterCard.
The NetBill Overview, "NetBill: An Internet Commerce System Optimized for Network Delivered Services".

*Primary Examiner*—Gail O. Hayes
*Assistant Examiner*—Hrayr A. Sayadian
*Attorney, Agent, or Firm*—Michael A. Glenn

[57] ABSTRACT

A system provides an efficient way of providing electronic accounts to customers over a public network, in which all payments are traceable, i.e. anonymity is available to the degree that the customer provides an account number for paying for the transaction, and that uses as much as possible of emerging public network payment protocols. One embodiment of the system handles small payment from customers to merchants without burdening the banks with each small transaction by aggregating the payment at a payment gateway from the customers and to the merchants.

22 Claims, 3 Drawing Sheets

METHOD AND APPARATUS FOR PROVIDING ELECTRONIC ACCOUNTS OVER A PUBLIC NETWORK

BACKGROUND OF THE INVENTION

1. Technical Field

The invention relates to accounts that support financial transactions over a computer network. More particularly, the invention relates to a combining multiple financial transactions, where such transactions are of an amount that is below a minimum acceptable threshold for consummating a standard transaction with an acquirer.

2. Description of the Prior Art

A fast-growing trend on the Internet is the ordering and provision of information, goods and services via the World Wide Web, electronic mail, and other means. A key issue for this electronic commerce is how payments may be accomplished efficiently, reliably, and securely. A number of organizations have addressed this issue by establishing proprietary payment systems which vary widely in design, performance, and security features. This clearly calls for standardization.

Payments in the non-electronic world are accomplished via cash, checks, credit and debit cards, money, postal orders, and other mechanisms. Electronic equivalents of all these payment systems are being developed. See, for example M. Linehan, G. Tsudik, *Internet Keyed Payments Protocol (iKP)*, Internet-Draft <draft-tsudik-ikp-00.txt> (July 1995) (an architecture for secure payments that involves three or more participants in which a base protocol includes a number of options that can be selected to meet varying business or security requirements, for example by applying cryptographic techniques to minimize potential risks concerning payments over the open Internet).

See, also L. Stein, E. Stefferud, N. Borenstein, M. Rose, *The Green Commerce Model*, First Virtual Holdings, Inc., October 1994 (http:\\www.infohaus.com); N. Borenstein, M. Rose, *The application/green-commerce MIME Content-type*, First Virtual Holdings, Inc., October 1994 (http:\\www.infohaus.com); and *Encryption and Internet Commerce*, First Virtual Holdings, Inc., 1995 (http:\\www.infohaus.com); and First Virtual Holdings, Inc., Wired, pp. 51 (October 1995), MacWorld, pp. 114 (November 1995) (an on-line transaction clearing house in which accounts are established off-line via telephone, and in which a transaction requires an account number, where each transaction is confirmed by the clearing house via email); CyberCash, MacWorld, pp. 114 (November 1995) (an electronic payment system that uses cryptography to prevent eavesdroppers from stealing and unscrupulous merchants from overcharging); NetCheque, University of Southern California, MacWorld, pp. 114 (November 1995) (an on-line checking system in which an account holder can send an electronic document that a recipient can deposit electronically into a bank account as a check, where the document contains the name of the payer, financial institution, payer's account number, payee's name, and amount of check, and which includes a digital signature of the payer and which may include a digital signature of a payee); and DigiCash, MacWorld, pp. 114 (November 1995) (an Internet payment systems, referred to as eCash, that provides digital money without an audit trail, thereby protecting the privacy of parties to the transaction).

Additionally, electronic commerce systems have been proposed by Visa International Service Association in collaboration with Microsoft Corporation (Secure Transaction Technology, using digital signature to authenticate a credit card and merchant decal; see http:\\www.visa.com); and MasterCard (Secure Electronic Payment Protocol, a collection of elements including an authorized holder of a bankcard supported by an issuer and registered to perform electronic commerce, a merchant of goods, services, and/or information who accepts payment from the holder electronically, a MasterCard member financial institution that supports merchants by providing service for processing credit card based transactions, a certificate management system that provides for the creation and distribution of electronic certificates for merchants, financial institutions, and cardholders, and a network to interface the merchants, financial institutions, cardholders, and certificate management system; see http:\\www.mastercard.com).

The prior art that is cited above addresses those transactions that normally exceed a certain monetary threshold, such as the minimum sales amount that a merchant would normally allow a customer to charge on a credit card.

One system that is intended to support such micromerchants is described in *NetBill: An Internet Commerce system Optimized for Network Delivered Services*, Carnegie Mellon University, http:\\www.ini.cmu.edu:80\netbill (1995), which uses a single protocol that supports charging in a wide range of service interactions. For example, NetBill provides transaction support through libraries integrated with different client-server pairs. These libraries use a single transaction-oriented protocol for communication between client and server and NetBill; the normal communications model between client and server is unchanged.

In NetBill, the client library and the server library incorporate all security and payment protocols, relieving the client/server application developer from having to worry about these issues. All network communications between the checkbook and till are encrypted to protect against adversaries who eavesdrop or inject messages.

Before a customer begins a typical NetBill transaction, he usually contacts a server to locate information or a service of interest. The transaction begins when the customer requests a formal price quote for a product. The customer's client application then indicates to the checkbook library that it would like a price quote from a particular merchant for a specified product. The checkbook library sends an authenticated request for a quote to the till library which forwards it to the merchant's application. The merchant then must invoke an algorithm to determine a price for the authenticated user. He returns the digitally signed price quote through the till, to the checkbook, and on to the customer's application. The customer's application then must make a purchase decision.

The application can present the price quote to the customer or it can approve the purchase without prompting the customer.

If the customer's application accepts the price quote. The checkbook then sends a digitally signed purchase request to the merchant's till. The till then requests the information goods from the merchant's application and sends them to the customer's checkbook encrypted in a one-time key, and computes a cryptographic checksum on the encrypted message. As the checkbook receives the bits, it writes them to stable storage. When the transfer is complete, the checkbook computes its own cryptographic checksum on the encrypted goods and returns to the till a digitally signed message specifying the product identifier, the accepted price, the cryptographic checksum, and a timeout stamp.

Upon receipt of the electronic payment order, the till checks its checksum against the one computed by the checkbook. If they do not match, then the goods can either be retransmitted, or the transaction aborted at this point. If checksums match, the merchant's application creates a digitally signed invoice consisting of price quote, checksum, and the decryption key for the goods. The application sends both the electronic payment order and the invoice to the NetBill server. The NetBill server verifies that the product identifiers, prices and checksums are all in agreement.

If the customer has the necessary funds or credit in his account, the NetBill server debits the customer's account and credits the merchant's account, logs the transaction, and saves a copy of the decryption key. The NetBill server then returns to the merchant a digitally signed message containing an approval, or an error code indicating why the transaction failed. The merchant's application forwards the NetBill server's reply and (if appropriate) the decryption key to the checkbook.

Unfortunately, however useful support for such micromerchants may be, the NetBill system requires excessive network bandwidth to support the multiple data transfers between the NetBill server.

iKP, ibid., et al address a subset of the real world mechanisms that involve direct payment transfers among accounts maintained by banks and other financial organizations. This includes credit and debit card transactions, as well as electronic check clearing, but excludes electronic cash and money orders because these transaction require very different mechanisms. The goal of iKP is to enable Internet-based secure electronic payments while using the existing financial infrastructure for payment authorization and clearance. The intent is to avoid completely, or at least minimize, changes to the existing financial infrastructure outside the Internet.

Payment systems incorporate tradeoffs among cost, timeliness, efficiency, reliability, risk management, and convenience. For example, some systems attempt to suppress fraud by inducing payment delays. Security in payment systems means minimizing risk to a level acceptable to participants. Risk management in existing systems is accomplished by varying combinations of technology, payment practices, insurance, education, laws, contracts, and enforcement. iKP uses cryptographic technology to accomplish a new tradeoff among these competing considerations. Thus, public-key cryptography is adopted to support, in a scalable manner, payments among parties who have no pre-existing relationship. To facilitate export of iKP, the use of encryption is restricted to the protection of sensitive data, such as PINs and account numbers. To provide broad implementation flexibility, the iKP protocol is defined such that it can be implemented in any combination of software and hardware.

Many existing cryptographic protocols, such as SSL (K. E. B. Hickman, *The SSL Protocol,* Internet Draft <draft-hickman-netscape-ssl-00.txt>, April 1995), SHTTP (E. Rescorla, A. Schiffman, *The Secure HyperText Transfer Protocol,* Internet Draft <draft-rescorla-shttp-0.txt>, December 1994), PEM (J. Linn, *Privacy Enhancement for Internet Electronic Mail: Part I: Message Encryption and Authentication Procedures,* RFC 1421, February 1993), MOSS (S. Crocker, N. Freed, J. Galvin, *MIME Object Security Services,* Internet Draft <draft-ietf-pem-mime-08.txt>, March 1995), and IPSP (R. Atkinson, *Security Architecture for the Internet Protocol,* Internet Draft <draft-ietf-ipsec-arch-02.txt>, May 1995), provide security functions for pairwise communication.

For example, SSL provides privacy and authentication, but no non-repudiation, between clients and servers of application-layer protocols, such as HTTP and FTP. Many payment systems involve three or more parties, i.e. buyer, seller, and bank. In such systems, certain types of risk can be ameliorated by sharing sensitive information only among a subset of the parties. For example, credit card fraud can be reduced by transmitting credit card account numbers between buyers and banks without revealing them to sellers. This motivates the development of new protocols.

Both symmetric key and public key cryptographic systems are known. A symmetric key cryptographic system is so called because it uses the same key to encode the message as to decode it. Examples of such system run from simple substitution ciphers that have been known for 2000 years, to the cipher system invented by Thomas Jefferson that was actually used by the U.S. in World War II, and the recently adopted the Data Encryption Standard. The advantage of such systems is that they are generally fast given modern day computers and they are reasonably secure.

A big disadvantage of such systems is that two communicating parties must have arranged to share the key in advance. However, one cannot always know in advance with whom one might want to communicate in a secure fashion. Thus, such a system is inadequate for network communication where people want to communicate securely with each other on very short notice, but have not arranged ahead of time to share a key. Even if there was adequate time, the cost of sharing a key would not necessarily be inexpensive because the system would still require a secure form of mail to transmit the key ahead of time.

The invention of the public key system solved this problem. The public key system provides two keys for a message, a public key and a private key. The public key is known to all who want to know it, while the private key is only known to the person who whose security is at stake. The public key is used to encode the message and the private key is used to decode the message. Thus, if A wants to send a message to B, A first encodes the message using B's public key and then sends the message to B. B decodes the message using his private key. If B wanted to send a message to A in response, he would similarly use A's public key to encode the response, and A would decode such response using A's private key.

The best known public key system, RSA, is based on a private key consisting of two large prime factors and a public key which is the composite that is the product of the two primes. What makes this RSA work is that the decoding problem is equivalent to factoring the composite into its primes which is a very time-consuming calculation, compared to multiplying the prime numbers together to get the composite.

One disadvantage of the public key system is that it takes more computation to perform the encoding step than do symmetrical key systems. While the computation time is acceptable for many purposes, it is significantly slower than symmetric key systems, such as DES. This becomes a problem when one considers the sending of voluminous amounts of encrypted material.

The prior art also includes systems which combine both systems. Thus, if party A and party B wish to communicate, party A selects a symmetrical (e.g. DES) key, encodes it using B's public key, and sends it to B. B decodes it using his private key. Now that both have a copy of the same symmetrical key, they can securely communicate using that key.

Another important aspect of the public key system is the digital signature. A digital signature is a message that is encoded by A in A's private key that can be read by anyone using A's public key. This is called a digital signature because only A is assumed to have the private key, so any message encoded in it must have been sent by, or at least authorized by A. It should be noted that a message bearing A's digital signature can be encrypted in B's public key and sent to B. This message is now one that only B (or a possessor of B's private key) can read, and it is also ensured to be an authentic message from A as it was encoded uses A's private key.

SUMMARY OF THE INVENTION

The invention herein disclosed provides the Internet commerce community with an Electronic Money Account (EMA) where, for example a buyer connected to the Internet can purchase electronic money from a Payment Gateway (PG), deposit the electronic money in an EMA in the PG, and use the EMA to purchase goods on the Internet, based on an underlying Secure Courier System (SCS).

One significant difference between the PG described here and other technology is that the PG is more efficient. This is particularly valuable because the sale of low priced items, i.e. microtransactions, is desirable on the Internet and other networks. The payments in the described scheme are traceable should a customer wish to dispute a charge. The system herein described also allows a customer to purchase merchandise without having to disclose the account number to the merchant. When the customer sends an account number to the merchant, he does so in an encrypted form which the merchant cannot read, but which the merchant can pass on to the PG.

The Internet Payment Gateway is designed to meet the following goals:

Use as much as possible of the emerging Internet payment protocols. There should be no necessity to create new protocols if the existing protocols are sufficient.

The system should be able to handle such transactions as small payments from customers to merchants without burdening the banks with each small transaction. This is accomplished by aggregating the payment at the PG from the customers and to the merchants.

The PG has separate customer and merchant databases that keep the current state of the system without containing proprietary information about any of the entities mentioned above, such as credit card numbers.

DETAILED DESCRIPTION OF THE INVENTION

The Internet Payment Gateway (PG) herein described is designed to overcome a serious deficiency in the prior art.

For example, current electronic banking and funds transfer can only work economically for amounts above a certain dollar threshold amount. For example, a credit card purchase for the amount of $0.50 would likely be refused. The herein disclosed system supports, inter alia, such small transactions. This is important to provide the ability to make very low cost purchases quickly and efficiently and is therefore likely to create new products and markets for very low priced items. This is particularly true on networks such as Internet, where merchants often market access to information. Further, the invention provides a mechanism that facilitates the transfer of funds over a public network for any financial trasnactions that move such funds from one electronic location to another. Thus, the invention supports a form of virtual currency that references real world currency that can be aggregated and exchanged for real currency as desired.

Figure 1:
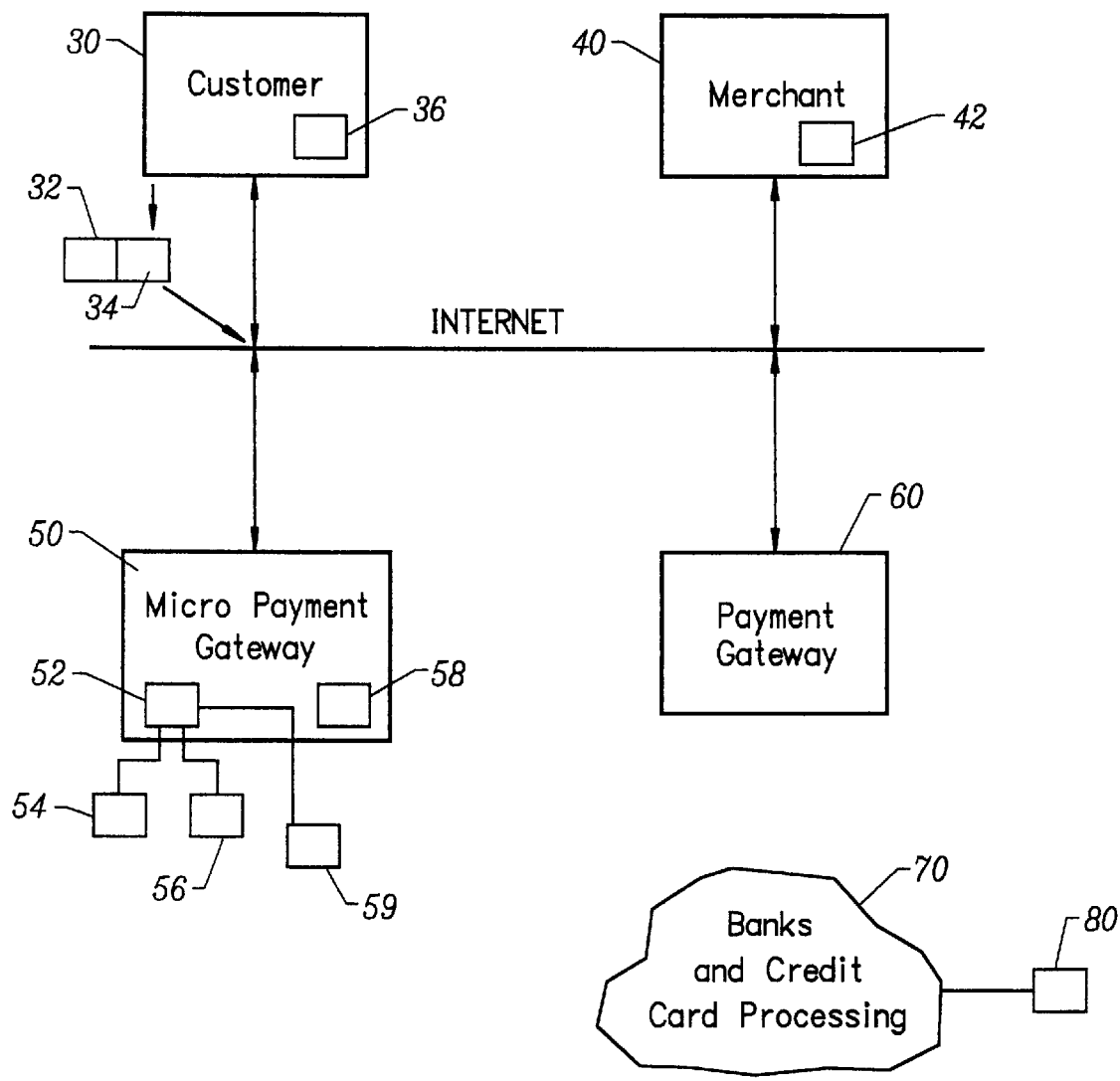
FIG. 1 is a block schematic diagram of an electronic commerce model according to the invention.

FIG. 1 is a block schematic diagram of an electronic commerce model 10 according to the invention. The invention herein disclosed provides the Internet commerce community with an Electronic Money Account (EMA) whereby a customer 30 connected to the Internet 20 can purchase electronic money from a Payment Gateway (PG) 50, deposit the electronic money in an EMA in the PG, and use this EMA to purchase goods from a merchant 40 over the Internet, based on an underlying Secure Courier System (SCS). It should be apreciated that the commerce model described herein is just one application of the invention and that the invention is intended for use in any system where electronic funds are transferred or aggregated. For example, an individual account holder may transfer funds into his account from any network source of funds, he may transfer funds out of his account, or he may transfer funds to another individual (e.g. a merchant), as well as convert funds between a virtual and real form.

One significant difference between the PG described here and other technology is that the PG is more efficient. This is particularly valuable because, for example the sale of low priced items, ie. microtransactions, is desirable on the Internet and other networks. Thus, the payments in the described scheme are traceable should a customer wish to dispute a charge. The system herein described also allows a customer to purchase merchandise without having to disclose the account number to the merchant. While the customer sends an account number to the merchant, he does so in an encrypted form which the merchant cannot read, but which the merchant can pass on to the GP.

The Payment Gateway operates, for example in conjunction with the credit/debit cards payment gateway 60 described in the copending U.S. patent application Ser. No. 08/555,976, filed Nov. 13, 1995, and commonly assigned to Netscape Communications, Inc., which application is incorporated herein in its entirety by this reference thereto. Such gateway comprises a secure transport layer including a channel security mechanism comprising a keyed message digest computation, wherein said secure transport layer supports data privacy and integrity for communications between any two network nodes, such that two secure channels are provided, where there is one channel between a customer and a merchant and another channel between said merchant and an acquirer gateway such that said merchant and said acquirer are authenticated to each other and to said customer; and a secure courier message for implementing an electronic payment protocol that provides at least any of signature, non-repudiation, and secondary encryption terms wherein node-to-node authentication, privacy, and data integrity are automatically achieved by said secure transport layer, such that conditions of guaranteeing message integrity and privacy are not required by said payment protocol.

The PG uses the SCS in two ways to achieve the objectives set forth above:

The PG protocol uses certain buying and selling transactions which are supported by the PG. For example, the customer makes purchases for his EMA with the PG protocol.

A customer's EMA can be drawn down to purchase goods from merchants.

Figure 2:
FIG. 2 is a flow diagram showing the purchase of funds for an EMA according to the invention.
Figure 2:

The primary PG protocols for the EMA are as follows:

The customer buys an amount of electronic money (e.g. $20.00) from the PG using the SCS by providing a bank account number, credit card number, or other electronic currency supported by the secure courier system. This transaction is a simple purchase transaction within SCS in which the customer is a customer and the PG is a merchant selling coins. This transaction is shown in FIG. 2 and consists of a purchase order and an optional acknowledgment.

Figure 3:
FIG. 3 is a flow diagram showing another method of purchase transaction using an EMA according to the invention.
Figure 3:
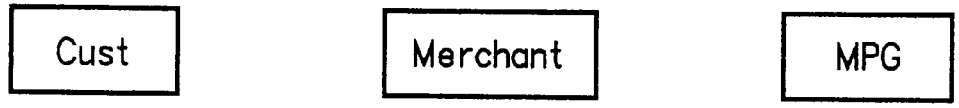

In one embodiment of the invention, a customer shops on the network and decides to buy an item worth, e.g. $0.50, from a merchant on the network. He purchases the goods from the merchant using the SCS just as he would with any transaction using credit cards or a bank account to debit from. In this transaction, the merchant recognizes that the use of the PG is specified as the acquirer, rather than a bank. Accordingly, the merchant performs an acquirer transaction with the PG. The PG credits the merchant's EMA account and debits the customer's EMA account. The PG then sends an authorization response to the merchant. The merchant can then complete the transaction with the customer by shipping the goods or providing the service. This transaction is shown in FIG. 3 and consists of a purchase order and an optional acknowledgment.

Figure 4:
FIG. 4 is a flow diagram showing a protocol where the merchant cashes in an EMA according to the invention.
Figure 4:
Figure 5:
FIG. 5 is a flow diagram showing the authorization that is used in the SCS and that is needed to complete the purchase shown in FIG. 1.
Figure 5:

At the end of a predetermined time, e.g. at the end of each day, the PG uses the SCS as a customer and buys from each merchant the money it owes the merchant for its EMA purchases. This also uses the SCS, so that the merchant is paid by a credit card or by putting funds into a merchant bank account. This transaction is shown in FIG. 4 and consists of a purchase order and an optional acknowledgment.

Each of these transactions follows the SCS protocol. That is, each transaction consists of a purchase order and an optional acknowledgment. The acknowledgment is optional in that acceptance of the purchase order is all that is needed to initiate the provision of the requested service, goods, or EMA. In an alternative implementation, the recipient of a purchase order can return a denial if it did not accept the purchase order, rather than with an acknowledgment if it did.

It should also be noted that the mechanism shown on FIG. 2 is part of the SCS protocol and includes other messages to complete the transaction. In particular, the PG when acting as a merchant, communicates with an acquirer gateway 70 (FIG. 1) to obtain authorization from a financial institution 80 for payments made for the EMA. According to the SCS protocol, the PG verifies that funds are available in the in the customer's PG EMA account as shown on FIG. 4

Alternatively, the use of the EMA may be entirely transparent to both the Customer and the Merchant. That is, the Customer's action in selecting a product automatically transfers funds from the Customer's EMA to the Merchant's EMA at the PG. Validation of the Customer's account and fund sufficiency occurs transparently as part of the purchase transaction.

In any event, the PG performs the function of maintaining an account for each user of electronic funds, such that for each transaction, e.g. a sales transaction or other transfer of funds, there are at least two aggregations, i.e. a debit from one account and a credit to one or more accounts. Additionally, the PG provides for the transfer of such funds between an EMA and a financial institution, such as a bank or credit card company.

General structure of the Payment Gateway

The Payment Gateway 50 includes a data base 52 containing information on each merchant and each customer. Generally, the information in a customer's data base 54 is known to that customer, but is kept confidential from the merchant, while the information in the merchant's data base 56 is known the merchant but is kept confidential from the customer.

The customer gateway includes a customer application 36 that implements such functions as customer browsing and shopping, as well as generating purchase orders and signatures for transactions. The customer application also verifies signatures from the merchant to ensure origination of messages, such that an order as supplied in a receipt matches an original order generated by a customer earlier. The customer gateway also generates signatures on payment messages using an optional public key certificate.

The merchant gateway includes a merchant application 42 that provides server functions for the customers to obtain product information and pricing. The merchant application also generates a transaction ID for a customer order to track the order until it has been authorized by an acquirer, such that the transaction IDs are used only once.

The merchant application also verifies an acquirer signature on responses and a customer signature on receipts; generates receipts for customer signatures; and generates digests of order information for said acquirer to verify authenticity of a purchase order.

The payment gateway also includes an acquirer application 58 that receives order amounts and transaction IDs with customer financial information. The payment gateway also updates the current balance due to a merchant in both a merchant data base 54 and an acquirer data base 59. The acquirer application receives order amounts and transaction IDs with customer financial information and updates the current balance due to a merchant in both the merchant data base 54 and the acquirer data base 59. The acquirer application also receives requests and performing confirmation.

The PG consists of the following components:

The Customer database

This database contains the following fields:

Customer name: This is an alphabetic text that is used to identify the customer.

Customer PG account number: This is a number the PG uses to identify the customer uniquely.

Public Key certificate: This contains the merchant account.

Customer bank account number(s): This is the number of a bank account, credit card, or other identification of a bank account which the customer has specified that money can be taken from or sent to. This number includes a unique identifier of the bank or financial institution where the account exists.

Customer Identifier: This is information the customer provides, such as a mother's maiden name, that is used to identify the customer for various purposes, such as canceling the account.

Available amount: This is the available electronic money in the EMA that the customer has purchased but not yet spent.

The Merchant database

The merchant database contains the following fields:

Merchant name: This is an alphabetic text used to identify the merchant.

Merchant PG account number: This is a unique number assigned to the merchant by the PG.

Current aggregate amount due the Merchant: This is the total amount of electronic money the merchant is owed by the PG resulting from electronic money payments by customers.

The PG may also keep a data base of all transactions, or all transactions that have occurred since a particular date, for auditing or tracking purposes.

The Slip

The slip or payment instruction is not a message in the true sense because it is never sent alone between parties of the transaction. However, it is central to the operation of both the SCS and the PG, and provides the contents of many of the other messages. The slip uses the encrypting techniques that ensure the security of the PG.

Purposes of the Slip

The slip is a statement from the customer to charge the appropriate account for the goods and services delivered. The slip is normally sent encrypted to the merchant by the customer and then from the merchant to the PG. Although the slip may be sent directly to the PG by the customer, authorizing the PG to transfer funds to the merchant's EMA. The slip is encrypted in a key, such as the PG public key, decodable by the PG but not by the merchant. The slip provides the following security features:

1. It hides the customer account number from the merchant. It is desirable to hide the PG and any other account numbers from anyone without a need to know, lest such persons use it fraudulently to obtain money or goods. While existing systems allow the merchant to see such account numbers as they appear on credit cards and checks, an important aspect of the current invention is that the merchant does not need to know customer's account numbers. The customer encrypts his account number using the PG's public key. This means that this encrypted account is unreadable by anyone else.

2. It ties a payment authorization to a particular transaction. The slip is basically a statement from the customer specifying the precise agreement between the merchant and the customer. By issuing the slip, the customer indicates agreement to the transaction. By using the slip for payment, the merchant also agrees to the contents of the transaction. The encryption techniques are such that the slip can only be verified as a whole, so that a new slip cannot be constructed from its parts by someone who does not possess the appropriate key.

3. It prevents overcharging for a particular transaction. The payment instruction contains a maximum amount of EMA that is authorized for the transaction. The PG normally denies requests from a merchant for funds beyond the limit specified.

4. It provides a time-limit for charging. The slip contains an expiration time, after which the PG may no longer allow the merchant to cash in EMA on the account. Thus, if the money is not spent by that time, the customer can credit it to his account.

5. It provides purchase instruction tracking information for use by the acquirer. Normally, the PG requires that the merchant provided a unique identifier for each payment instruction that is presented for deposit.

6. It provides an optional signature by the customer. The signature, if present, may be used by the PG or the merchant to prove the verify the participation of the customer in the transaction.

The Purchase Transaction

The purchase transaction consists of two basic parts: a purchase order 32 and a slip 34 (FIG. 1).

The purchase order specifies the goods being purchased but does not indicate the payment method. The purchase order contains information which both the customer and the merchant must know but which may be kept from the MGP.

The slip, on the other hand, contains information which both the customer and the MP must know, but which may be kept from the merchant even though the in the normal course of transactions, the merchant possesses an encrypted copy of the slip.

Purchase-Order: Customer→Merchant

The purchase order contains the following fields:

Customer Name
Validity Period
Items
Total Amount
Currency
Merchant ID (MID)
Transaction ID TxID)
Shipping address The contents of the slip include:

currentDate: the time that the slip was created. This value is used for tracking purposes.

expireDate: the time at which the slip expires. This may be checked by the Acquirer and the transaction rejected if the slip is submitted by the Merchant past this date.

totalAmount: the maximum total charges that the Merchant may make against this slip. This field contains both a currency (in ISO 4217 format) and a units field. The units field is a formatted monetary value, including a currency symbol and decimal separator as appropriate. The choice of currency symbol and separator should match those in general use for the ISO 4217 currency indicated.

orderHash: the result of a message digest function applied to a description of the transaction. The field is a PACS #7 DigestedData type, which includes the hash algorithm identifier. The importance of the orderhash is that when the PG decodes the slip, it uses the orderhash to compare with the orderhash provided by the merchant in the merchant sends an authorization request.

meracqHash: a hash of the data that is exchanged between the merchant and the acquirer with this slip. The nature of this data is unknown to the customer, but may include a unique identifier for the slip that is used by the acquirer to prevent multiple use by the merchant.

PG ACCOUNT: contains PG account number for the customer. This is normally in the form of a public key certificate.

The slip is normally encoded as a signed message from the customer. This normally means encoding the slip using the public key of the PG.

The PG payment protocol handler.

The PG may include all portions of the SCS protocol for executing the above transactions. The gateway portion is used for the actual transaction, the transaction server portion is used for the customer sign-up, and the client portion is used for payment to the merchant.

The interface to the acquirer gateway.

The PG 50 interfaces with an acquirer 70 (e.g. a bank 80) so that it can get paid for the EMA it sells, and so it can pay merchants when it buys back the EMA. The PG interfaces to the acquirer 70 through the acquirer gateway 60 as a merchant dealing with an acquirer. In this regard, the PG needs to follow all rules and regulations enforced by the banking community on merchants.

The PG interface to the Merchants.

The PG interfaces to the merchants in two ways, the first as a gateway that authorizes micropayments and the second as a customer paying for an electronic item valued at the daily aggregate amount.

The interface to the customers.

The PG interfaces to the customers as a merchant for buying electronic coins to be used in micro-transactions.

Detailed transactions

In addition to the EMA transactions described above, there are other transactions that are also involved. For example, both customers and merchants must be signed up for the PG. All of these transactions use the same payment protocol used by the credit card gateway. The following sections detail the transactions used in each phase:

The merchant sign-up

A merchant signs up with the PG by establishing an account number for micropayments. The merchant must provide a name and show a business license and other usual papers and mechanisms to get an PG account. As part of the merchant sign-up procedure, the PG assigns the merchant a unique merchant number to identify him in the various transactions. The PG creates an entry in the merchant data base for this merchant. Initially, the merchant's account contains a zero balance and amounts are added to the merchant's account as customers purchase goods from the merchant and their payment is authorized by the PG.

The customer sign-up

The customer sign-up process consists of two phases. In the first phase, the customer establishes an account with the PG. This involves furnishing a name and some information that can be used later to administer or cancel the account. As a part of this process the customer is given a copy of an PG certificate which contains the PG public key and which the customer uses in encoding the payment information for merchants to transmit to the PG.

The customer purchase of electronic money

The second phase is performed when the customer purchases electronic money from the PG. The customer accesses the PG as if the PG is a merchant selling electronic money, as was described above. The customer (or more precisely, his computer application) prepares the slip and a purchase order for the electronic money and sends it to the PG. Both of these items are encoded according to the SCS. The PG then submits the slip to the acquirer gateway for simultaneous authorization and clearing according to the SCS protocol . When the acquirer gateway authorizes payment, the PG updates the customers electronic account to reflect the amount of electronic money he purchased and optionally sends the customer an acknowledgment. The customer can now spend electronic money in his EMA.

The Electronic Money Transaction

An electronic money transaction proceeds exactly as a regular order using a credit or debit card or other account, except that the PG assumes the role of the acquirer gateway. The customer decides to buy an item and prepares both a purchase order and a payment slip. The customer encrypts the payment information using the public key from the PG certificate and submits the slip to the merchant. This process is shown in FIG. 2. Alternatively, the slip may be sent directly to the PG, such that the transfer of funds to the merchant's EMA takes place entirely within the PG only as authorized by the customer.

The merchant then asks the PG to authorize the payment passing on the encoded payment information. The PG uses its private key to decrypt the payment information. This is shown in FIG. 3. The PG then compares the payment amount in the transaction with the current available balance for the customer. If the customer has a sufficient balance, then the payment is authorized and the customer and merchant PG accounts are adjusted accordingly.

Note that the merchant has not received any payment so far. Only the PG accounts for the particular customer have been adjusted. The customer's PG account can be viewed as a prepaid account, however, non-prepaid versions are easily supported as well by preauthorization of a credit limit.

The Payment to the Merchant

At the end of a pre specified period of time (daily for example), the PG pays the merchant for the aggregate amount from all transactions completed. This is done using the same payment protocol with the PG acting as a customer buying the money in the merchant's electronic money account.

The PG prepares a purchase order and a payment slip for the merchant to verify and submit to the acquirer gateway for authorization and payment. This implies the PG has an account that is used to pay the merchant. Another requirement is for the merchant to have a electronic money which it can sell to the PG. Otherwise, this step is exactly the same as a customer ordering some items from the merchant.

At the end of some period, for example at the end of each day, the PG makes a purchase of the cumulative electronic money owed to a merchant. To complete this transaction, the SCS transfers money to the merchant's account as is shown on FIG. 4. The merchant takes the slip from this transaction and sends it to the acquirer to credit the moneys owed to the merchant's account.

While there are likely a great deal of monetary transactions between the merchant and the PG, many of which can be for very small amounts of money according to this protocol, there are only two transactions where the acquirer (bank) is involved:

(1) the purchase of electronic money by the customer (FIG. 2); and (2) the payment for electronic money to the merchant (FIG. 4).

Both of these transactions typically reflect larger sums and are less frequent than transactions where goods are purchased with electronic money. Because the cost of transactions with the PG are less expensive than the cost of transactions with banks through an acquirer gateway, this provides a major benefit of the system, i.e. the ability to support large number of very small transactions at low cost.

An important aspect of the invention is to provide the merchant with the ability to collect several payments into a single transaction with the acquirer. Thus, the system described herein provides the Internet commerce community with an efficient way of vending low priced items to the customers without increasing the load on the bank network, and more generally with a mechanism for effecting the use of electronic cash over a public network, such as the Internet. All payments in the described scheme are traceable. Also each customer's transactions are kept confidential because only the bank and customer know what account is involved and only the merchant and customer know what goods were purchased.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A system for affecting a transfer of funds over a public network, comprising:

an acquirer;

a gateway connected to said public network, said gateway comprising a plurality of individual accounts;

at least one individual account of said plurality of individual accounts comprising means for aggregating a first all or a portion of funds in said plurality of individual accounts until said aggregated funds are greater than or equal to a minimum acceptable transaction amount for said acquirer;

means within said gateway for supporting a plurality of authenticated transactions between holders of said plurality of individual accounts;

means within said gateway for transferring the first all or a portion of said aggregated funds between the individual account of said plurality of individual accounts and said acquirer;

means at said acquirer for defining said minimum acceptable transaction amount for said acquirer;

a first node on said public network, which first node purchases a second all or a portion of funds in said plurality of individual accounts from said gateway and which transfers all or a portion of said purchased funds;

a second node on said public network which receives at least all or a portion of said purchased funds from said first node;

means at said first node for transferring all or a portion of said purchased funds via said gateway;

means at said second node for transferring said received all or a portion of said purchased funds via said gateway;

at least one customer node; and at least one merchant node comprising means for effecting at least one purchase transaction with said customer node;

means at said merchant node for transferring a plurality of purchase transactions for aggregation into an electronic money account at said gateway; and an electronic payment protocol for implementing said transactions as secure courier messages.

2. The system of claim 1 wherein said authenticated transactions contain a digital signature.

3. The system of claim 4, wherein said digital signature is generated in connection with a private key in a public key cryptographic system.

4. The system of claim 1, further comprising:

means for encrypting an channel communications between any two nodes in said system.

5. The system of claim 1, further comprising:

means for authenticating said customer.

6. The system of claim 1, wherein said electronic payment protocol further comprises means for hashing at least one message to avoid early termination type attacks, and to assure that messages arrive at a recipient unaltered.

7. The system of claim 6, each message further comprising an acknowledgement that is generated by a recipient and sent to a sender to acknowledge receipt of the message.

8. The system of claim 1, further comprising:

means for encrypting confidential customer information; and means for said customer sharing a decrypt key with said acquirer, but not with said merchant.

9. The system of claim 1, further comprising:

means for encrypting specific order information; and means for said customer sharing a decrypt key with said merchant, but not with said acquirer.

10. The system of claim 1, wherein digital signatures are communicated between all parties to ensure authorship between two parties that are not necessarily communicating directly with each other.

11. The system of claim 1, further comprising a secondary encryption term for defining encryption of message data fields for decryption by a third party that is not a recipient of an entire message.

12. The system of claim 1, wherein each electronic payment message further comprises:

a slip, and a purchase order.

13. The system of claim 12, wherein the message purchase order consists of at least one or more of an order number and routing information.

14. The system of claim 1, further comprising:

a customer application comprising browsing and shopping means, as well as means for generating purchase orders and signatures for transactions, said customer application further comprising means for verifying signatures from said merchant to ensure origination of messages, such that an order as supplied in a receipt matches an original order generated by a customer earlier.

15. The system of claim 14, said customer application further generating signatures on payment messages using a public key certificate.

16. The system of claim 1, further comprising:

a merchant application comprising server means for said customers to obtain product information and pricing, said merchant application further comprising means for generating a transaction ID for a customer order to track said order until it has been authorized by said acquirer, wherein said transaction IDs are used only once.

17. The system of claim 16, said merchant application further verifying an acquirer signature on capture responses and a customer signature on receipts.

18. The system of claim 16, said merchant application further generating receipts for customer signatures.

19. The system of claim 16, said merchant application further generating digests of order information for said acquirer to verify authenticity of a purchase order.

20. The system of claim 1, further comprising:

an acquirer application comprising means for receiving order amounts and transaction IDs with customer financial information and means for updating a current balance due to a merchant in both a merchant data base and an acquirer data base.

21. The system of claim 1, wherein said gateway aggregates funds for each of said first end second nodes in separate electronic money accounts.

22. The system of claim 21, wherein an acquirer transaction is initiated when said electronic money accounts aggregate a predetermined amount of funds.

* * * * *